(No Model.)

3 Sheets—Sheet 1.

E. E. DAILEY.
GORE CUTTER AND MARKER.

No. 514,618.

Patented Feb. 13, 1894.

Witnesses.
Louis W. Gould
Fred S. Greenleaf

Inventor:
Edward E. Dailey
by Crosby & Gregory Attys.

(No Model.) 3 Sheets—Sheet 2.

E. E. DAILEY.
GORE CUTTER AND MARKER.

No. 514,618. Patented Feb. 13, 1894.

Witnesses.
Fred S. Greenleaf.
Louis W. Gowell.

Inventor:
Edward E. Dailey.
by Crosby & Gregory
Attys.

THE NATIONAL LITHOGRAPHING COMPANY,
WASHINGTON, D. C.

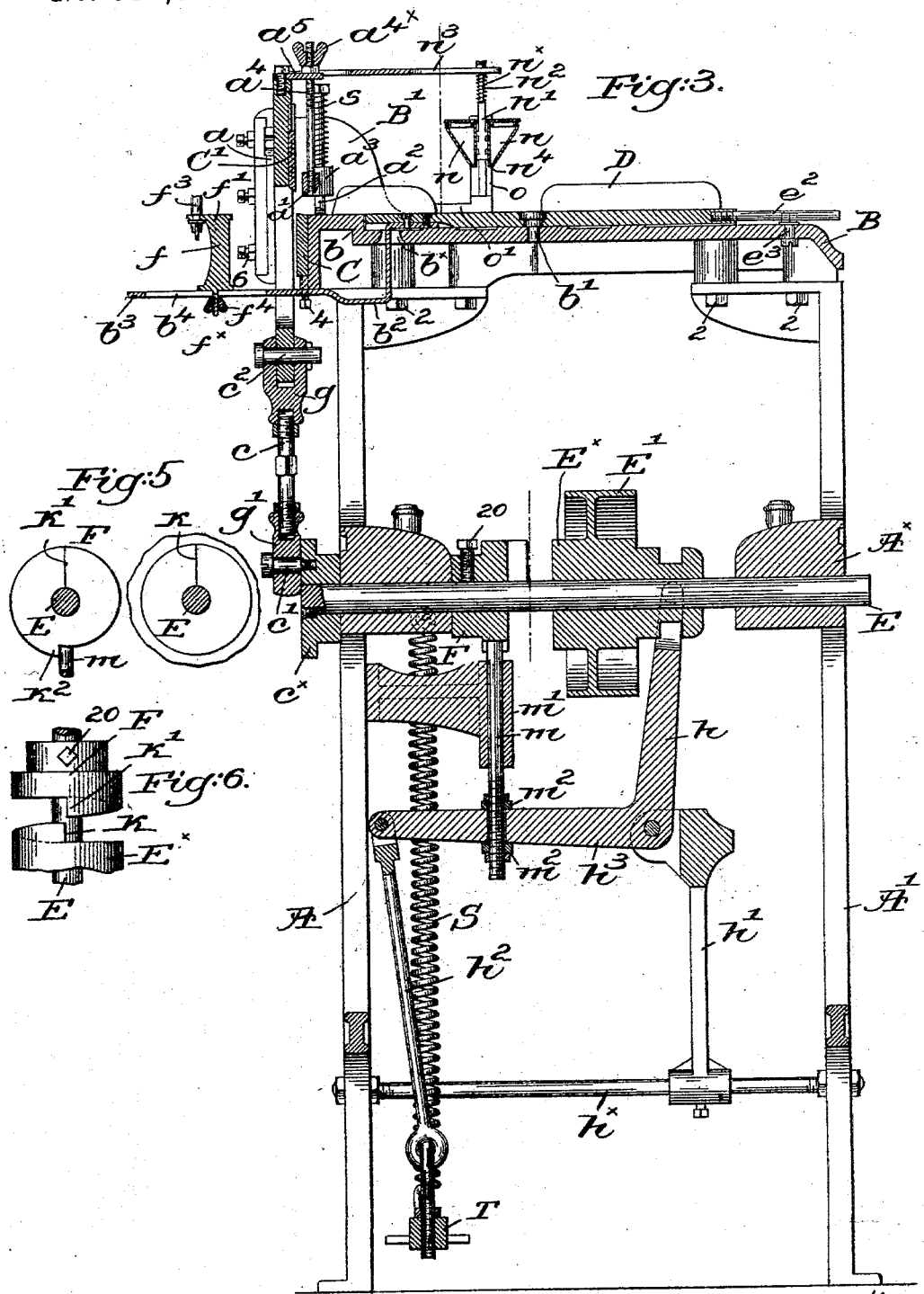

UNITED STATES PATENT OFFICE.

EDWARD E. DAILEY, OF MARLBOROUGH, MASSACHUSETTS.

GORE CUTTER AND MARKER.

SPECIFICATION forming part of Letters Patent No. 514,618, dated February 13, 1894.

Application filed June 5, 1893. Serial No. 476,666. (No model.)

*To all whom it may concern:*

Be it known that I, EDWARD E. DAILEY, of Marlborough, county of Middlesex, State of Massachusetts, have invented an Improvement in Gore Cutters and Markers, of which the following description, in connection with the accompanying drawings, is a specification, like letters and figures on the drawings representing like parts.

This invention has for its object the production of a machine for cutting gores for shoes, whereby greater accuracy and rapidity of operation may be obtained than is possible with the methods now in vogue, the apparatus being so devised that right and left gores are cut, means being provided for adjusting the apparatus to cut gores of various sizes and shapes.

I have herein shown my invention as applied to a power-actuated machine, but it is obvious that the same may be actuated by the hand or foot of the operator, though with a loss of rapidity in operation.

Figures 1, 4:
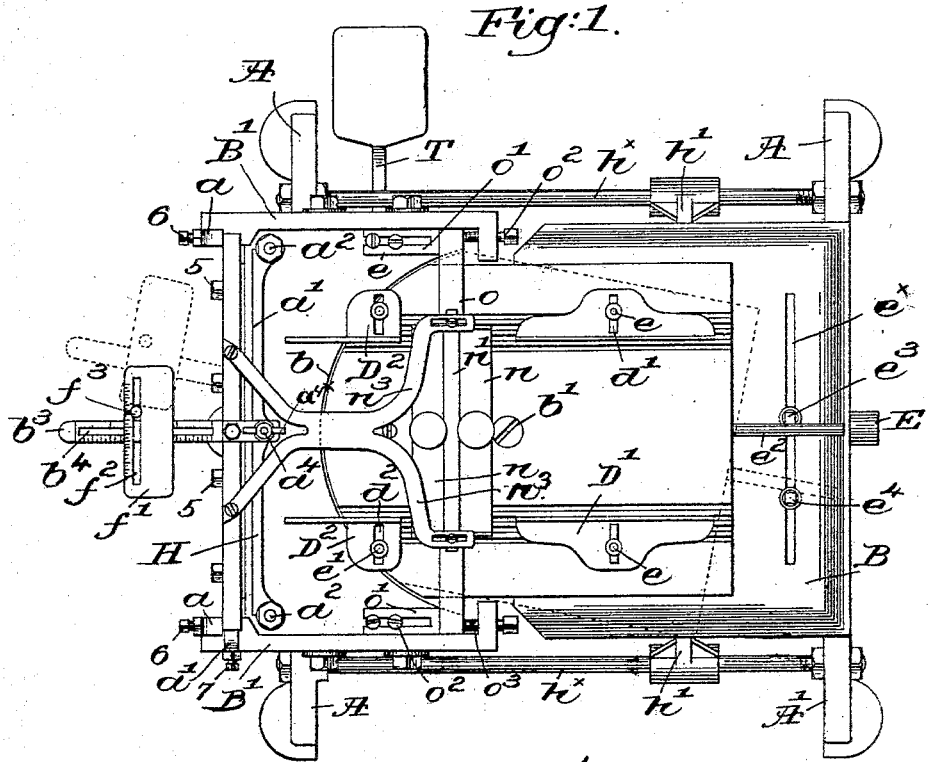
Figure 2:
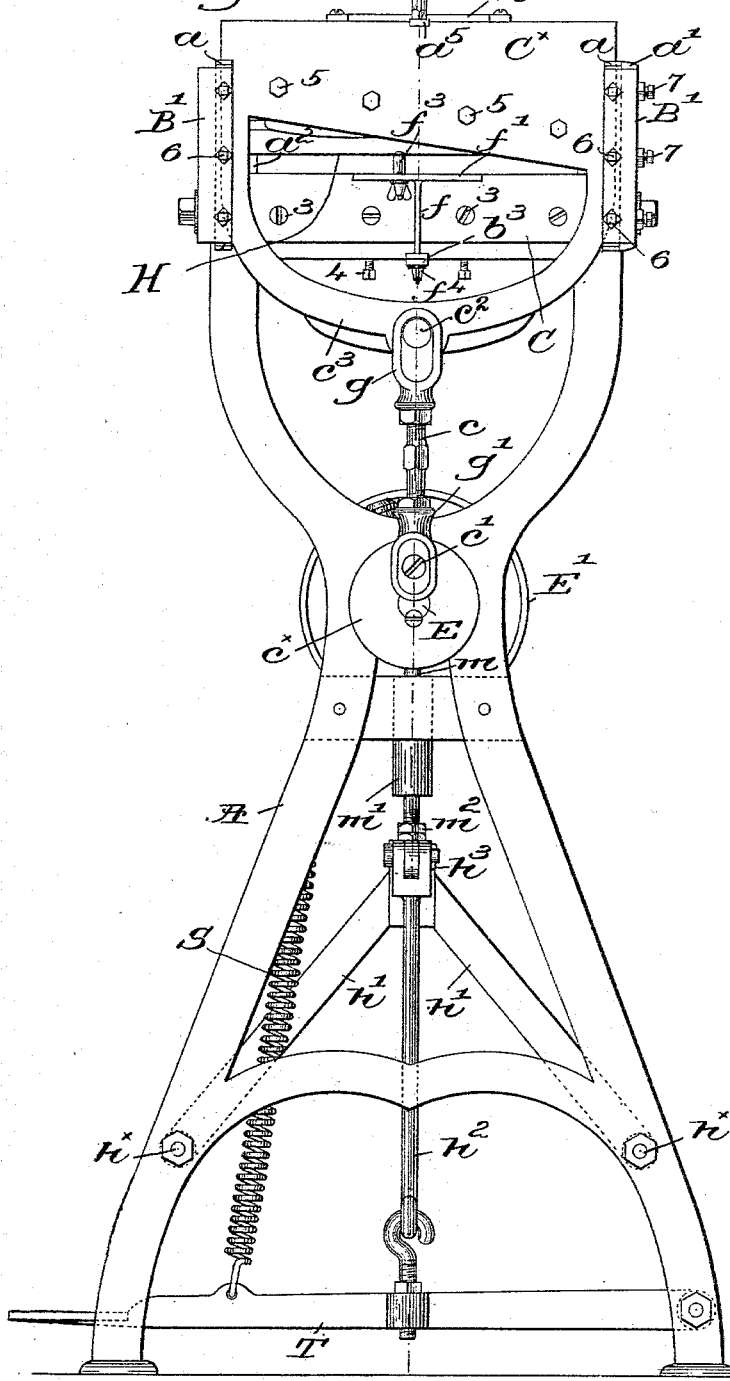

Figure 1 is a top view of a machine embodying my invention. Fig. 2 is a left hand end view thereof. Fig. 3 is a vertical section taken on the line $x$, $x$, Fig. 2. Fig. 4 is a detail to be described. Figs. 5 and 6 are face and top views respectively of the clutch mechanism to be described.

The end frames A, A', of suitable shape to support the operating parts of the apparatus, are connected at their upper ends by a bed-plate B secured thereto by suitable bolts 2, 2, the said bed-plate being recessed at one end, see Fig. 3, to receive the fixed cutting blade C rigidly secured to the bed-plate by suitable screws 3 and capable of slight vertical adjustment by adjusting screws 4, see Figs. 2 and 3. Brackets B' are secured to the bed plate by suitable bolts, as shown in Figs. 1, 2 and 3, the outer vertical edges of said brackets being grooved to form guides for the carrier $C^\times$ of the movable blade C', the carrier, as best shown in Fig. 2, being reciprocated in the brackets by means of a link $c$ pivotally connected at its ends to the carrier and to a crank-pin $c'$, as will be described. The carrier is recessed at its inner side, and the blade C' is secured thereto by nuts 5, whereby the blade may be adjusted to compensate for wear or when ground down. The guides in the brackets B' are provided with suitable brasses $a$, $a'$, held in place and adjusted by set screws 6 and 7 respectively, whereby the wear occasioned by the reciprocation of the carrier may be taken up.

H represents a bar-like presser arranged parallel with and immediately back of the upper cutter C', said presser being provided at its ends with suitable heads $a^3$ through which pass the vertical studs or screws $a^2$ standing up from the bed B, said studs or screws constituting guides for the presser in its vertical movements. A lifting rod $a^4$ tapped into a lug on the presser, preferably at its middle, is extended upwardly through an ear $a^5$ on the carrier $C^\times$, said lifting rod being threaded at its upper end to receive a thumb nut $a^{4\times}$ which is screwed down on the top of said ear.

Springs $s$ are interposed between the heads $a^3$ of the presser H and the heads of the screws or bolts $a^2$, said springs tending to force the presser down upon the bed or upon a piece of gore laid thereupon, the movements of the presser, however, being controlled by the lifting rod $a^4$, so that the presser can only descend with and slightly in advance of the upper-cutter C'.

I have herein shown the bed-plate as depressed for a portion of its length, as best shown in section Fig. 3, the vertical wall or shoulder $b$, connecting the depressed and raised portions, being arc shaped and having for its center the pivotal screw $b'$ upon which is pivoted a swinging work-table D, clearly shown in Fig. 1, the front end of said table being curved to correspond to the shoulder $b$, whereby it may be turned from side to side upon its pivot $c$, for a purpose to be described.

I have provided the top of the work-table, as herein shown, with a series of longitudinal grooves $d$ to receive therein work gages D' and D$^2$, said gages having vertical faces downwardly extended, as at $d^\times$, see Fig. 4, to enter one or other of the grooves $d$, the bases of the gages being slotted, as at $d'$, $d^2$, respectively, through which are extended adjusting screws $e$ and $e'$, and by loosening the screws the feet $d^\times$ of the gages may be lifted sufficiently to remove them from one to another of the grooves $d$ to thereby regulate the distance between the vertical faces of the gages according to the length of the gores from top to bottom.

The material from which the gores are to be cut is previously cut or made to the proper width which will correspond to the length of the gore, and the material is placed upon the work-table D and held in place thereon between the gages D', D².

In Fig. 1 the work-table is shown in full lines as at right angles to the plane of the cutting blades, and is maintained in such position by a lug or projection $e^2$ extended from the rear end of the work-table and bearing against an adjusting screw $e^3$ extended through a slot $e^x$ at the rear of the bed-plate, the movement of the table upon its pivot being regulated by the position of a second adjusting screw $e^4$ against which the lug or projection $e^2$ bears when the table is swung into the dotted line position in Fig. 1. The bed-plate is also slotted at $b^x$ near and parallel to the curved shoulder $b$, and a bent arm $b^2$ is secured to the under side of the work-table in suitable manner, said arm being extended down through said curved slot and having a forward horizontal extension $b^3$ to sustain a post or standard $f$, the laterally extended top $f'$ of which is substantially level with the work-table top and slotted at $f^2$, a gage $f^3$ being adjustably secured in said slot, the post or standard $f$ being adjustable bodily toward or from the cutting-blades by a threaded shank $f^x$ extended through a slot $b^4$ in the extension of the bent arm and provided with a set screw $f^4$, as best shown in Fig. 2. The slots $b^4$ and $f^2$ are each provided with scales, and it will be seen that by adjusting the standard $f$ toward or from the blades the position of the gage $f^3$ will be regulated and thereby the width of the gore, as will be described, and by moving the said gage $f^3$ a greater or less distance to one or the other side of the center of the scale adjacent to the screws $f^2$ the inclination of the diagonal side of the gore may be adjusted.

In operation the plies of the material are fed forward over the work-table $d$ and the blades are closed to trim the leading end of the material, the table being in its full line position. The blades are then opened, the table is swung upon its pivot into dotted line position, and the material is moved forward until the edge just cut rests against the gage $f^3$ and the blades are again closed, cutting the material diagonally, as will be evident, the gore or gores so cut having one straight side at right angles to the top and bottom edges of the gore and a diagonal side. The blades are then opened, the tables swung into full line position and the material fed forward, its leading edge, which is now diagonal to its sides, impinging against the gage $f^3$, the blades are then closed and the material severed, the side so cut being the straight side of the gore. This operation is repeated, the material being cut alternately straight across and diagonally, as described. Whenever the upper cutter C' is brought down to co-operate with the lower cutter C for the purpose of cutting the material, the descent of the lifting rod $a^4$ permits the spring $s$ to force the presser down upon and to hold tightly in position the material to be cut, said presser being again raised to release the material when the upper cutter is raised. The thumb nut $a^{4x}$ furnishes means by which to adjust the position of the presser with relation to the upper cutter so that the latter may always descend slightly in advance of the upper cutter, and to clamp or hold the material firmly before the said upper cutter comes in contact therewith, thereby preventing displacement of the material and insuring accurate cutting.

In order to actuate the blades by power I have formed suitable bearings $A^x$ on the frame A, A', of the apparatus, and have extended therethrough a shaft E having secured to its forward end a disk $c^x$ carrying a crank-pin $c'$ to which is pivotally connected one end of the link $c$, the other end of said link being connected by pin $c^2$ with the ridge-like portion $c^3$ of blade-carrier $C^x$, the ends of the link $c$ having right and left hand screw-threads thereon engaging the bearing blocks $g$ and $g'$, respectively rotation of the link in one or the other direction adjusting the distance between the crank-pin $c'$ and the connecting pin $c^2$ to thereby vary the stroke of the blade C'.

A loose pulley E' is longitudinally movable upon the shaft E and forms one member of a clutch mechanism to be described, the pulley being moved longitudinally by one arm $h$ of an elbow lever supported on a bracket $h'$ suitably sustained upon cross rods $h^x$ connecting the end frames of the machine, said lever being connected by a link $h^2$ to a treadle T, the treadle being normally held elevated, and the pulley E' retracted by means of a spring S, see Figs. 2 and 3. The hub $E^x$ of the pulley is provided upon its inner face with a shoulder $k$, see Figs. 5 and 6, to engage at times the shoulder $k'$ on the inner face of the other member F, rigidly secured to the shaft E by a set screw 20, the clutch member F having also upon its periphery a shoulder $k^2$, see Figs. 3 and 5, adapted to be engaged by a locking device, herein shown as a rod $m$ sliding in a bracket $m'$ secured to or forming part of the frame of the apparatus, the lower end of the said rod being threaded and extended loosely through an opening in the arm $h^3$ of the elbow lever, and retained in adjusted position by suitable nuts $m^2$.

The pulley E' is rotated continuously by power transmitted thereto from any suitable source, by a belt not shown, and when the operator desires to sever the material on the work-table, in the manner hereinbefore described, he depresses the treadle T, thereby turning the elbow lever on its pivot and moving the member $E^x$ of the clutch longitudinally upon the shaft until the shoulder $k$ engages the shoulder $k'$ of the other member of the clutch, the arm $h^3$ of the elbow lever withdrawing the locking pin $m$ at the same time from engagement with the shoulder $k^2$, thus permitting the two clutch members to rotate together and thereby rotating the crank-pin $c'$, and through the link $c$ drawing down the blade $C'$ and severing the material. The operator releases the treadle instantly, and the spring S throws the member $E^x$ out of engagement with the member F of the clutch and the parts return to their normal position shown in Fig. 3, the locking device at the same time being moved up into the path of and to be engaged by the shoulder $k^2$ of the clutch member F to stop its rotation positively by such engagement.

The apparatus herein shown and described is very convenient, permits the use of the operator's hands to feed the material forward, and all the guides and cutting mechanism are in plain view of the operator throughout the operation. The gage $f^3$ is set at one or the other side of the center of the work-table, according to the direction which it is desired to give to the diagonal side of the gore.

It is desirable sometimes to indicate upon the gores the lines along which the stitching is to be made, and in order to so mark the gores I have shown a simple and efficient mechanism, the same consisting, as herein shown, of two hollow receptacles $n, n$, being preferably triangular in cross section, as shown in Fig. 3, and provided with a series of perforations along the lower corner $n^4$. The cross-piece $n'$ is guided by suitable uprights $o$, the bases $o'$ thereof being slotted and held in adjusted position on the bed-plate by set-screws $o^2$, a fine adjustment being obtained by the threaded bolts $o^3$ supported in the brackets $B'$ and bearing against the slotted bases described. The receptacles are provided with powdered chalk, soapstone, or other suitable marking material, and by means of the adjusting screws $o^3$ they are set to properly mark the material on each side of the cut, and at each descent of the blade-carrier the receptacles will be brought down in a yielding manner on the material resting upon the work-table and sufficient portion of the marking material will be deposited thereon to indicate the lines for stitching.

This invention is not restricted to the precise construction and arrangement of parts as herein shown and described, nor to the exact clutch mechanism, as it is obvious that other forms may be used, and that the details of the apparatus herein shown may be altered without departing from the spirit of my invention.

I claim—

1. In a machine for cutting gores, the following instrumentalities, viz;—a work-table, gages co-operating therewith to guide the edges of the material, cutting blades, normally at right angles to said gages and blade supports adjacent to the work-table, a gage for the leading end of the material, located beyond said blades and maintained fixed with relation to said edge gages and devices to change the relative position of said blade supports and work-table, whereby the material is presented to the blades to be cut at substantially right angles to its edges, or diagonally thereto, substantially as described.

2. In a machine for cutting gores, the following instrumentalities, viz;—a work-table, gages co-operating therewith to guide the edges of the material, cutting blades, normally at right angles to said gages and blade supports adjacent to the work-table, a gage for the leading end of the material, located beyond said blades means to adjust it to vary the amount of feed of the material and thereby the width of the gore, and devices to change the relative position of said blade supports and work-table, whereby the material is presented to the blades at right angles or diagonally to its edges, substantially as described.

3. A work-table, a bed-plate upon which it is supported, a bent arm secured to said table, and a gage adjustable on said arm for the leading end of the material, combined with cutting blades located between said gage and table, edge gages co-operating with the table to guide the material thereon, and devices to change the relative position of said blades and the table and end gage, substantially as described.

4. In a gore cutter, cutting blades, a work-table provided with gages to guide the edges of the material, and devices to change the relative position of said blades and work-table, combined with a gage beyond the blades for the leading end of the material, means to adjust it to vary the inclination of the diagonal side of the gore, and stops to limit the relative movement of the blades and work-table, substantially as described.

5. In a gore cutter, cutting blades, and a swinging work-table provided with gages for the material, combined with a gage for the leading end of the material, means to adjust it laterally and longitudinally, and limiting stops for the table, substantially as described.

6. In a gore cutter, a slotted bed-plate, a fixed cutting blade secured thereto, and a swinging table pivoted to said bed-plate, combined with a movable blade, means to reciprocate it, a bent arm secured to the table and extended through the slotted bed-plate and beyond the blades, and a gage carried by said arm for the leading end of the material, substantially as described.

7. A bed-plate provided with a depressed portion, a work-table pivoted to swing therein, adjustable stops to limit the movement of the table, and gages upon the table for the edges of the material, combined with a fixed blade, a movable blade, a carrier therefor, and guides for the carrier, said blades being located adjacent to the table, substantially as described.

8. In a gore cutter, a swinging work-table, a series of longitudinal parallel grooves at each side thereof, gages to enter and be held in place by the grooves, and means to secure said gages in adjusted position, combined with cutting mechanism to sever the material as it is fed over the work-table, substantially as described.

9. In a machine for cutting and marking gores, gages for the edges of the material, a fixed and a movable cutting blade, and a reciprocating carrier for said movable blade, combined with marking devices secured to said carrier in a yielding manner, comprising a receptacle to contain marking material, and having exit openings therefor, adapted to be pressed upon the material to mark the same when the carrier descends, substantially as described.

10. In a machine for cutting gores the following instrumentalities, viz:—a work table, co-operating gages for the edges of the material, a fixed and a movable cutting blade, an intermittingly rotated shaft, connections between it and said movable blade to reciprocate the latter, an automatic locking device to positively stop the rotation of said shaft at a fixed point when the blade has been reciprocated, and means to withdraw said locking device and rotate the shaft simultaneously, substantially as described.

In testimony whereof I have signed my name to this specification in the presence of two subscribing witnesses.

EDWARD E. DAILEY.

Witnesses:
FREDERICK L. EMERY,
AUGUSTA E. DEAN.